March 29, 1955  R. E. MARBURY  2,705,301
DUAL VOLTAGE CAPACITOR BANK
Filed June 14, 1952  2 Sheets-Sheet 1

WITNESSES:
John E. Heasley
Nev. L. Groome

INVENTOR
Ralph E. Marbury
BY F. P. Lyle
ATTORNEY

March 29, 1955

R. E. MARBURY 2,705,301

DUAL VOLTAGE CAPACITOR BANK

Filed June 14, 1952

WITNESSES:

INVENTOR
Ralph E. Marbury.
BY
ATTORNEY

United States Patent Office 2,705,301
Patented Mar. 29, 1955

2,705,301

DUAL VOLTAGE CAPACITOR BANK

Ralph E. Marbury, Pittsburgh, Pa., assignor to Westinghouse Electric Corporation, East Pittsburgh, Pa., a corporation of Pennsylvania Application June 14, 1952, Serial No. 293,537

8 Claims. (Cl. 323—128)

The present invention relates to shunt capacitor banks, and more particularly to a capacitor bank intended for continuous operation at its normal rated voltage, and for operation at a higher voltage for short periods.

Capacitor banks are frequently connected in shunt to transmission and distribution lines to improve the power factor and reduce the line current. Standard capacitor units, such as are used in these banks, are designed for continuous operation at their normal rated voltage, but such capacitors can safely withstand operation at somewhat higher voltages for short times, the permissible duration of the overvoltage decreasing as the voltage is increased, and being determined primarily by the heating effect for voltages up to about 150% of the normal voltage, and primarily by the possibility of damage to the capacitor dielectric at higher overvoltages where the permissible duration is so short that heating effects are of little importance.

There are many cases where the usefulness and advantages of shunt capacitor banks could be greatly increased by operating the bank at an increased voltage for short periods, in order to increase the reactive kva. of the bank, which varies with the square of the voltage applied to the capacitors. Thus, for example, if the reactive kva. of a capacitor bank could be substantially increased upon the occurrence of a fault on the line to which it is connected, the bank would be very effective in assisting to maintain the line voltage during the fault condition, acting in much the same manner as a low-reactance synchronous condenser, but at much lower cost and without the maintenance problems involved in the use of rotating equipment. Similarly, when a large motor is supplied from a long, high-reactance line, the starting current drawn by the motor during starting frequently causes excessive voltage drop in the line. If such a motor is provided with a capacitor bank for correcting the power factor during normal operation, the starting current drawn from the line, and the resulting voltage drop, could be very materially reduced by increasing the reactive kva. of the capacitor bank during the starting period.

Since the voltage of the line to which a capacitor bank is connected is fixed, the increased voltage on the capacitors must be obtained by reconnecting the bank, but no satisfactory way of doing this has been known. One obvious way of increasing the voltage applied to the capacitors would be to connect the bank in Y for normal operation and to reconnect it in delta when increased kvar. output is required, thus raising the voltage applied to the capacitors by a factor of 1.73 and increasing the kvar. of the bank by three times. Such an arrangement is not suitable for actual use, however, for several reasons. In order to effect the reconnection, the circuit must be opened, and it would be necessary to use two circuit breakers or one very special breaker, either of which would be relatively expensive, while the time required to open the circuit and reclose it in the delta connection would be too great for many applications. The transient overvoltages resulting from the switching operation in reconnecting such a bank would be very high, and when superimposed on the increased voltage, the resulting transient overvoltage would be too severe to be tolerated in most cases. Thus, this means of increasing the voltage applied to a capacitor bank is not satisfactory for actual use.

The principal object of the present invention is to provide a shunt capacitor bank which can readily be reconnected to increase the voltage applied to the capacitors without opening the circuit and without involving any excessive transient overvoltages, or other switching problems.

Another object of the invention is to provide a shunt capacitor bank which can readily be reconnected to increase the voltage applied to the capacitors, and which can easily be designed to obtain any desired increase in voltage within the practical limits of permissible overvoltages.

Other objects and advantages of the invention will be apparent from the following detailed description, taken in connection with the accompanying drawing, in which.

Figure 1:
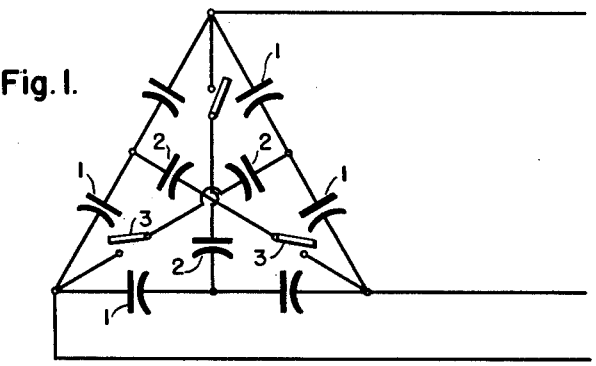
Figure 1 is a circuit diagram showing the connection of the capacitor bank.

Fig. 1 shows a three-phase capacitor bank consisting of a plurality of main capacitors 1 and a plurality of auxiliary capacitors 2. It will be understood that, although each of the main capacitors 1 and auxiliary capacitors 2 may be a single capacitor unit, they will usually consist of a number of individual capacitor units connected together in parallel, or series-parallel, to obtain the desired capacitive reactance and current capacity. The term "capacitor," as used herein, is to be understood, therefore, as referring to a group of individual capacitor units connected together in any suitable manner, as well as to a single unit.

In accordance with the invention, the main capacitors 1 are connected in delta, as shown in Fig. 1, with two capacitors in series in each side of the delta. Each of the auxiliary capacitors 2 is connected by means of a switch 3 between one corner of the delta and the midpoint of the opposite side. The main capacitors 1 are all identical, having a capacitive reactance which will be designated $X_1$, and the auxiliary capacitors 2 are also identical, having a smaller reactance $X_2$.

Figure 2:
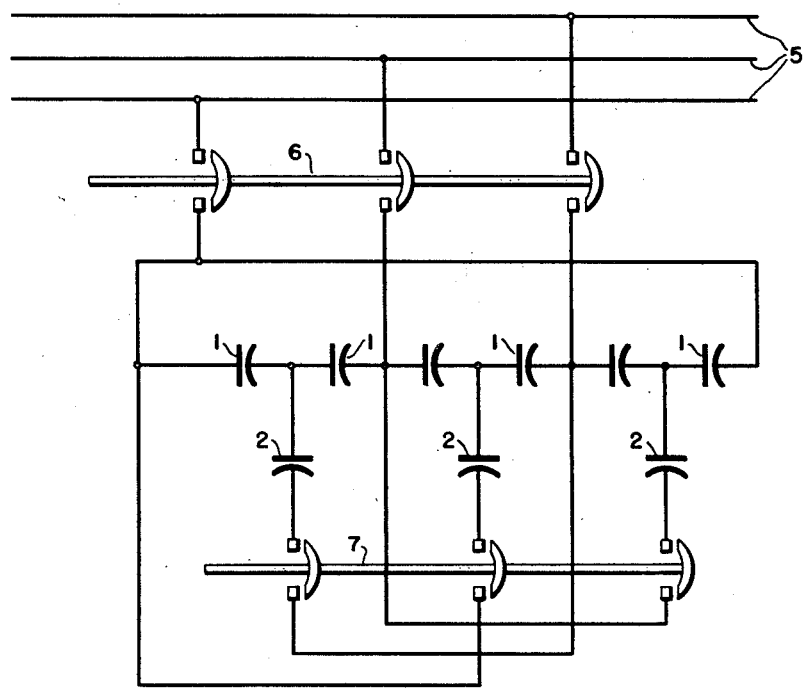
Fig. 2 is a schematic wiring diagram showing a practical arrangement of a capacitor bank embodying the invention.

Fig. 2 shows schematically a practical arrangement for a large three-phase bank connected to a three-phase line 5 by means of a circuit breaker 6. The main capacitors 1 are connected in delta, with two capacitors in series in each side of the delta, as in Fig. 1. It will be understood that each of these capacitors will normally comprise a relatively large number of capacitor units disposed in a suitable housing or housings, which may be of any usual type. The auxiliary capacitors 2 will usually be much smaller than the main capacitors 1, that is, they will usually consist of a much smaller number of individual units, and they may be contained in a separate housing which preferably also contains a three-pole circuit breaker 7 for connecting the auxiliary capacitors 2 between the corners of the delta and the mid-points of the opposite sides, the connections being as indicated in Fig. 2, and the circuit being the same as that of Fig. 1.

In normal operation, the switches 3 or the breaker 7 are open, so that the bank is a delta-connected bank with two capacitors in series in each side of the delta. Under normal conditions, therefore, the voltage across each of the main capacitors 1 is equal to one-half the line-to-line voltage of the line 5, and the voltage ratings of the capacitors are selected on this basis. When it is desired to increase the reactive kva. of the bank by increasing the voltage applied to the capacitors, the switches 3 or circuit breaker 7 are closed. This connects each of the auxiliary capacitors 2 between a corner of the delta and the midpoint of the opposite side, and it will be seen that the effect of this is to connect each of the main capacitors 1 directly across one phase of the line in series with an auxiliary capacitor 2. The voltage applied to each of the main capacitors 1 is, therefore, increased by an amount depending on the reactance of the auxiliary capacitors 2. Thus, if the reactance of the auxiliary capacitors 2 were zero, the voltage applied to each of the main capacitors would be doubled, since the effect would be to change the connection from a series delta to a parallel delta. The presence of the auxiliary capacitors 2, however, reduces the voltage applied to the main capacitors 1, and it will be evident that an overvoltage of any desired magnitude, up to twice normal voltage, can be obtained by proper choice of the auxiliary capacitors 2.

Figure 3:
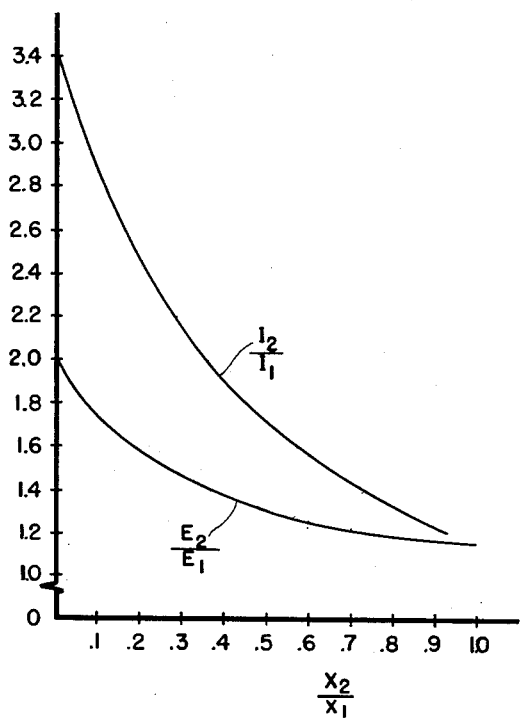
Figs. 3 and 4 are curves illustrating the characteristics of a capacitor bank embodying the invention.
Figure 4:
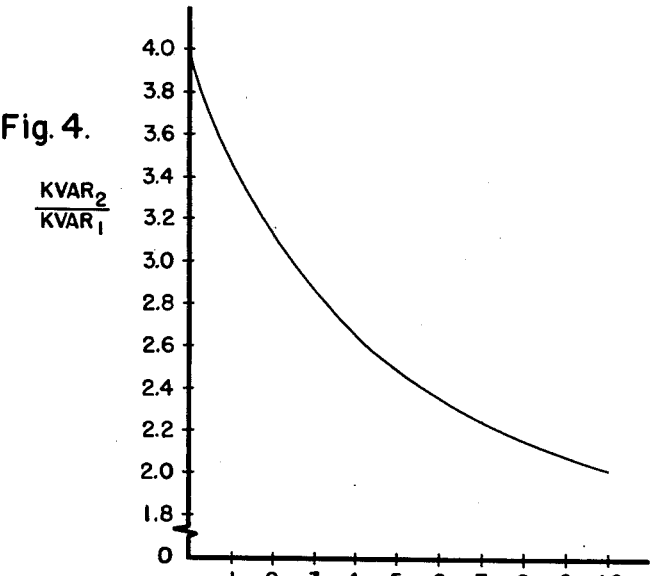

The effect of reconnecting the capacitor bank is illustrated in Figs. 3 and 4, which also show the effect of varying the value of the auxiliary capacitor reactance $X_2$ relative to the main capacitor reactance $X_1$. The lower curve of Fig. 3 shows the ratio of the voltage $E_2$ across each of the main capacitors 1 with the switches 3 closed to the normal voltage $E_1$ with the switches open, plotted as a function of the ratio of $X_2$ to $X_1$. It will be seen that as the value of $X_2$ is decreased, the overvoltage applied to the main capacitors increases to a maximum of twice normal voltage when $X_2$ becomes zero. An overvoltage of twice normal voltage is too high for actual use, because of the probability of permanently damaging the capacitor dielectric, with resultant early failure of the capacitors. It will be evident, however, that by proper choice of the reactance of the auxiliary capacitors 2 any desired increase in voltage within the permissible limits can be obtained. Fig. 3 also shows the effect on the currents of changing the reactance. The upper curve of this figure shows the ratio of the current $I_2$ in the auxiliary capacitors 2 when the switches 3 are closed to the normal current $I_1$ flowing in each side of the delta when the switches are open. This curve makes it possible to readily determine the necessary current rating of the auxiliary capacitors.

The reactive kva. of the main capacitors 1 is proportional to the square of the voltage applied to the capacitors. Thus, when the switches 3 are closed to reconnect the bank for the higher voltage, the reactive kva. supplied by the main capacitors 1 increases in proportion to the square of the voltage. The auxiliary capacitors 2, however, are also connected in the circuit, and the total reactive kva. of the bank is increased by the kvar. output of these capacitors. Fig. 4 shows the ratio of the total reactive output of the bank with switches 3 closed (kvar.$_2$) to the reactive output with the switches open (kvar.$_1$), plotted as a function of the ratio of $X_2$ to $X_1$. It will be seen from this curve that a large increase in reactive kva. can be obtained with auxiliary capacitors which are relatively small as compared to the main capacitors. Thus, for example, if it is desired to operate the main capacitors 1 at an overvoltage of 170%, which is comparable to the increase in voltage that would be obtained by reconnecting a Y-connected bank to delta, the lower curve of Fig. 3 shows that the value of $X_2$ required to obtain this overvoltage is 13% of the reactance of the main capacitors. A relatively small auxiliary capacitor is required, therefore, but as shown by Fig. 4, an auxiliary capacitor of this size will increase the kvar. of the bank by a factor of 3.36.

Thus, a large increase in the reactive kva. of a capacitor bank can be obtained in a simple and inexpensive manner by the use of a relatively small group of auxiliary capacitors, which can be connected in the manner shown for short times when the increased kvar. output is required. Thus, the circuit breaker 7 of Fig. 2 can be controlled automatically, in response to line voltage, or in any other desired manner, to close the breaker when the increased voltage is required. It will be noted that only a very simple switching operation is involved and that the circuit is not opened so that no severe transient overvoltages occur. A standard three-pole circuit breaker of relatively low cost can be used for connecting the auxiliary capacitors since there are no difficult switching problems. The bank can readily be designed to supply any desired increase in reactive kva. by proper choice of the auxiliary capacitors, the maximum obtainable being determined primarily by the length of time it is required, which determines the maxium voltage that can be applied to the main capacitors.

It will now be apparent that a capacitor bank has been provided which can readily be reconnected to increase the voltage applied to the capacitors and thus to increase the reactive kva. of the bank. Such a dual voltage capacitor bank has many applications, such as those mentioned above of maintaining system voltage during fault conditions or facilitating the starting of large motors. A preferred embodiment of the invention has been shown and described for the purpose of illustration, but it is to be understood that the invention is not limited to the specific illustrative embodiment shown but includes all equivalent embodiments and modifications.

I claim as my invention:

1. A capacitor bank comprising a plurality of capacitors connected in delta, and means for connecting an auxiliary capacitor between each corner of the delta and the mid-point of the opposite side.

2. A capacitor bank comprising a plurality of capacitors connected in delta, and switching means for connecting auxiliary capacitors between each corner of the delta and the mid-point of the opposite side to increase the voltage applied to the capacitors.

3. A capacitor bank comprising a plurality of capacitors connected in delta, each side of the delta having an even number of capacitors, and means for connecting an auxiliary capacitor between each corner of the delta and the mid-point of the opposite side.

4. A capacitor bank comprising a plurality of capacitors connected in delta, each side of the delta having an even number of capacitors, and switching means for connecting auxiliary capacitors between each corner of the delta and the mid-point of the opposite side to increase the voltage applied to the capacitors.

5. A capacitor bank comprising a plurality of capacitors connected in delta with two capacitors in series in each side of the delta, means for connecting the capacitor bank to a three-phase line, a plurality of auxiliary capacitors, and means for reconnecting the bank with each of the first-mentioned capacitors directly across one phase of the line in series with an auxiliary capacitor.

6. A capacitor bank comprising a plurality of capacitors connected in delta with two capacitors in series in each side of the delta, means for connecting the capacitor bank to a three-phase line, a plurality of auxiliary capacitors, and means for reconnecting the bank with two of the first-mentioned capacitors connected directly across each phase of the line in series with an auxiliary capacitor.

7. A capaictor bank comprising a plurality of capacitors connected in delta with two capacitors in series in each side of the delta, means for connecting the capacitor bank to a three-phase line, a plurality of auxiliary capacitors, and means for reconnecting the bank with two of the first-mentioned capacitors from different sides of the delta connected directly across each phase of the line in series with an auxiliary capacitor.

8. A capacitor bank comprising a plurality of capacitors connected in delta with two capacitors in series in each side of the delta, means for connecting the capacitor bank to a three-phase line, a plurality of auxiliary capacitors, and switching means for reconnecting the bank with an auxiliary capacitor connected between each corner of the delta and the mid-point of the opposite side.

References Cited in the file of this patent

UNITED STATES PATENTS

| Number | Name | Date |
|---|---|---|
| 2,036,844 | Willis | Apr. 7, 1936 |
| 2,110,656 | Bedford | Mar. 8, 1938 |
| 2,128,857 | Stacy | Aug. 30, 1938 |
| 2,443,117 | Pittman et al. | June 8, 1948 |
| 2,449,817 | Nordell | Sept. 21, 1948 |
| 2,484,866 | Strickland | Oct. 8, 1949 |

FOREIGN PATENTS

| Number | Country | Date |
|---|---|---|
| 705,766 | Great Britain | Mar. 17, 1954 |